US011124421B2

(12) United States Patent
Nicolas et al.

(10) Patent No.: US 11,124,421 B2
(45) Date of Patent: Sep. 21, 2021

(54) PROCESS FOR THE SYNTHESIS, WITH MULTIPLE SEEDING, OF ZEOLITE CRYSTALS HAVING A CONTROLLED PARTICLE SIZE

(71) Applicant: Arkema France, Colombes (FR)

(72) Inventors: Serge Nicolas, Lons (FR); Cécile Lutz, Gan (FR)

(73) Assignee: Arkema France, Colombes (FR)

( * ) Notice: Subject to any disclaimer, the term of this patent is extended or adjusted under 35 U.S.C. 154(b) by 183 days.

(21) Appl. No.: 16/493,593

(22) PCT Filed: Mar. 12, 2018

(86) PCT No.: PCT/FR2018/050570
§ 371 (c)(1),
(2) Date: Sep. 12, 2019

(87) PCT Pub. No.: WO2018/167416
PCT Pub. Date: Sep. 20, 2018

(65) Prior Publication Data
US 2021/0139337 A1 May 13, 2021

(30) Foreign Application Priority Data

Mar. 17, 2017 (FR) ...................................... 1752198

(51) Int. Cl.
| | | |
|---|---|---|
| *C01B 39/46* | (2006.01) | |
| *B01J 37/10* | (2006.01) | |
| *C01B 39/38* | (2006.01) | |
| *C01B 39/26* | (2006.01) | |
| *C01B 39/16* | (2006.01) | |
| *C01B 39/34* | (2006.01) | |
| *C01B 39/20* | (2006.01) | |
| *C01B 39/14* | (2006.01) | |
| *C01B 39/30* | (2006.01) | |
| *B01J 29/70* | (2006.01) | |
| *B01J 29/40* | (2006.01) | |
| *B01J 29/50* | (2006.01) | |
| *B01J 29/18* | (2006.01) | |
| *B01J 29/08* | (2006.01) | |

(52) U.S. Cl.
CPC .............. *C01B 39/46* (2013.01); *B01J 29/08* (2013.01); *B01J 29/18* (2013.01); *B01J 29/40* (2013.01); *B01J 29/50* (2013.01); *B01J 29/70* (2013.01); *B01J 29/7003* (2013.01); *B01J 29/7011* (2013.01); *B01J 29/7015* (2013.01); *B01J 29/7019* (2013.01); *B01J 37/10* (2013.01); *C01B 39/14* (2013.01); *C01B 39/16* (2013.01); *C01B 39/20* (2013.01); *C01B 39/26* (2013.01); *C01B 39/30* (2013.01); *C01B 39/34* (2013.01); *C01B 39/38* (2013.01); *C01P 2004/51* (2013.01); *C01P 2004/53* (2013.01)

(58) Field of Classification Search
CPC ......... C01B 39/14; C01B 39/16; C01B 39/20; C01B 39/26; C01B 39/30; C01B 39/34; C01B 39/38; C01B 39/46; C01P 2004/51; C01P 2004/53; B01J 37/10; B01J 29/08; B01J 29/18; B01J 29/40; B01J 29/50; B01J 29/70; B01J 29/7003; B01J 29/7011; B01J 29/7015; B01J 29/7019
See application file for complete search history.

(56) References Cited

U.S. PATENT DOCUMENTS

| | | | |
|---|---|---|---|
| 4,818,509 A | 4/1989 | Dwyer et al. | |
| 5,989,518 A * | 11/1999 | Tannous | ................ C01B 39/04 423/717 |
| 6,773,694 B1 | 8/2004 | Lesch et al. | |
| 10,850,988 B2 * | 12/2020 | Nicolas | ................ B01J 29/082 |
| 2009/0304890 A1 | 12/2009 | Ni et al. | |

FOREIGN PATENT DOCUMENTS

| | | |
|---|---|---|
| EP | 1609758 A2 | 12/2004 |
| EP | 3020686 A1 | 5/2016 |
| FR | 1357762 A | 4/1964 |

OTHER PUBLICATIONS

Warzywoda et al, Crystallization of high-silica ZSM-5 in the presence of seeds: Zeolites vol. 11, Issue 4, Apr.-May 1991, pp. 318-324 (Abstract only) (Year: 1991).*
International Search Report and Written Opinion for International Application No. PCT/FR2018/050570, dated May 9, 2018, 10 pages.
International Zeolite Association (www.iza-online,org), retrieved from the internet Sep. 25, 2019.

* cited by examiner

*Primary Examiner* — David M Brunsman
(74) *Attorney, Agent, or Firm* — RatnerPrestia

(57) ABSTRACT

The present invention relates to a process for preparing zeolite crystals having a multimodal particle size distribution, and the sizes of which are between 0.02 µm and 20 µm, said process comprising a first introduction of one or more seeding agents into the tubular reactor or upstream of the tubular reactor, and at least one second introduction of one or more, identical or different, seeding agents into the tubular reactor.

10 Claims, No Drawings

PROCESS FOR THE SYNTHESIS, WITH MULTIPLE SEEDING, OF ZEOLITE CRYSTALS HAVING A CONTROLLED PARTICLE SIZE

CROSS-REFERENCE TO RELATED APPLICATIONS

This is the national phase of International Application No. PCT/FR2018/050570, filed 12 Mar. 2018, which claims priority to French Application No. 1752198, filed 17 Mar. 2017. The disclosure of each of these applications is incorporated herein by reference in its entirety for all purposes.

FIELD

The present invention relates to the field of zeolites, more precisely the field of the industrial synthesis of zeolite crystals and more particularly that of the industrial synthesis of zeolite crystals having a controlled particle size.

BACKGROUND

The synthesis of zeolite crystals (or more simply "zeolite synthesis" in the remainder of the present document) is carried out conventionally in industry in a large-sized stirred "batch" reactor, generally with heating of the synthesis gel and/or reaction medium by injection of steam and/or by a heating jacket. The preparation of the synthesis gel consists in mixing a sodium aluminate solution with a sodium silicate solution, it being possible for this mixing to be carried out either in equipment upstream of the crystallization reactor or directly in the crystallization reactor.

It is then often necessary to carry out a low-temperature maturing phase, generally at a temperature below 40° C., for a longer or shorter duration, generally varying from a few tens of minutes to a few tens of hours, depending on the type of zeolite structure desired. This maturing phase makes it possible to form seed crystals that will give, by the growth thereof, zeolite crystals after the crystallization phase carried out at higher temperature.

The addition of seeds to the synthesis gel (seeding process) makes it possible however to eliminate this low-temperature maturing phase. Under these conditions, it is thus possible to control the mean size of the crystals by adjusting the amount of seeds introduced into the synthesis gel and thus form a reaction medium capable of forming zeolite crystals.

Therefore it is thus possible, or at the very least theoretically possible, to obtain zeolite crystals of various particle sizes, varying for example from several tens, or even several hundreds of nanometres to several tens of micrometres, it being understood that a synthesis reaction, with operating conditions suitable for this synthesis, results in the formation of zeolite crystals of relatively well-controlled, generally monomodal particle size characterized by a broader or narrower particle size distribution.

However, the fields of use of zeolites are today increasingly varied and increasingly require elaborate technologies, so that it is often necessary to have available zeolites having a controlled particle size of monomodal, bimodal or even multimodal distribution, the full width at half maximum (FWHM) of which can be regulated and controlled.

Indeed, it may be necessary these days to be able to provide zeolite crystals of controlled particle size, and more particularly of modulated particle size, in order for example to increase the compactness, the density, etc., depending on the targeted applications. In these applications, it is moreover often required to replace used zeolites, and it is therefore essential to be able to replace these used zeolites with new zeolites having the same particle size characteristics.

Versatile synthesis processes are therefore sought that make it possible to obtain zeolites having monomodal or multimodal particle size distributions that are well controlled and above all modulated, that is to say repeatable over time.

Synthesis processes are known that result in zeolite crystals having a relatively narrow monomodal particle size distribution. However, besides the fact that it is often difficult to reproduce several identical successive syntheses (often "batch" syntheses) very accurately in order to achieve the same particle size characteristics, these techniques do not generally make it possible to obtain multimodal particle size distributions.

In order to obtain zeolite crystals of different and well-defined sizes, it could be envisaged to produce physical mixtures of zeolite crystals having a perfectly well-defined monomodal distribution. Mixtures of zeolite crystals, that is to say physical mixtures of dry powders, are in reality rather unsatisfactory; indeed, it is very difficult to obtain homogeneous mixtures of crystals having particle sizes between several tens of nanometres and several tens of micrometres.

Therefore, there remains a need for a process for preparing zeolite crystals of controlled particle size, of modulated particle size, of monomodal or multimodal particle size distribution, with an adjustable FWHM, and having a particle size between several tens of nanometres and several tens of micrometres.

The Applicant has now discovered that the objectives described above can be achieved in full or at the very least in part by means of the process described below, which forms a first subject matter of the present invention. Other advantages and yet other subjects will appear in the description of the present invention that follows.

SUMMARY

Thus, the present invention firstly relates to a process for preparing zeolite crystals having a multimodal particle size distribution, and the sizes of which are between 0.02 µm and 20 µm, said process comprising at least the following steps:
  a) preparing a synthesis gel by mixing at least one source of silica, at least one source of alumina and optionally, but preferably, at least one aqueous alkali metal or alkaline-earth metal hydroxide solution,
  b) feeding a tubular reactor with said synthesis gel,
  c) first introduction of one or more seeding agents into the tubular reactor or upstream of the tubular reactor,
  d) second introduction of one or more, identical or different, seeding agents into the tubular reactor,
  e) carrying out the crystallization reaction, in the tubular reactor, of the synthesis gel in the presence of the seeding agent(s), forming the reaction medium,
  f) filtering the reaction medium in order to recover crystals produced.

DETAILED DESCRIPTION

The process of the invention is characterized by at least two introductions of seeding agent(s) while the crystallization reaction is carried out. Thus, step d) may be repeated one, two, three or more times, preferably one, two or three times, more preferably one or two times. At least two introductions are carried out at different degrees of advancement of the crystallization reaction. At least two introductions may thus be carried out at different times, or at different locations of the reactor, in particular in the case of continuous synthesis, for example in a tubular reactor operated continuously.

In a preferred embodiment of the invention, the first introduction of seeding agent(s) is carried out upstream of the reactor, that is to say that the seeding agent(s) is (are) mixed with the synthesis gel before introduction into the reactor where the crystallization takes place.

The synthesis gel may be any type of composition well known to a person skilled in the art depending on the type of zeolite to be prepared and typically comprises at least one source of silica and at least one source of alumina, and/or any other source of element(s) that may constitute a zeolite framework, for example a source of phosphorus, of titanium, of zirconium, etc. It is also possible, or even preferable, to add at least one aqueous solution of an alkali or alkaline-earth metal hydroxide, preferably of an alkali metal hydroxide, typically of sodium hydroxide and/or also organic structure-directing agents or templates.

A source of silica is understood to mean any source well known to a person skilled in the art and in particular a solution, preferably an aqueous solution, of silicate, in particular of alkali or alkaline-earth metal silicate, for example of sodium silicate, or of colloidal silica.

A source of alumina is understood to mean any source of alumina well known to a person skilled in the art and in particular a solution, preferably an aqueous solution, of aluminate, in particular of alkali or alkaline-earth metal aluminate, for example of sodium aluminate.

The concentrations of the various solutions of silica and alumina are adapted depending on the nature of the source of silica, of the source of alumina, the respective proportions of the sources of alumina and of silica to which the alkali or alkaline-earth metal hydroxide solution and/or one or more organic structure-directing agents are added, according to the knowledge of a person skilled in the art. Information will in particular be found on the chemical nature of the organic structure-directing agents to optionally be used as a function of the zeolite to be synthesized on the website of the International Zeolite Association (www.iza-online.org), for example and non-limitingly tetramethylammonium (TMA), tetra-n-propylammonium (TPA), methyltriethylammonium (MTEA).

The respective proportions and concentrations of the various silica and alumina solutions are known to a person skilled in the art or may be easily adapted by a person skilled in the art depending on the nature of the zeolite that it is desired to prepare, from data in the literature.

The synthesis gel from step a) is prepared as described above by mixing sources of silica and alumina in a basic medium. This mixing is advantageously carried out in a rotor-stator shear mixer, that is to say a shear mixer comprising a rotor that rotates at high speed and that makes the mixture pass through a stator, the geometry of which may vary.

The degree of shear is defined by the shear rate $\gamma$ in $s^{-1}$ which is equal to the tip speed of the rotor divided by the thickness of the gap between the rotor and the stator. The tip speed $V_p$ is calculated from the speed of rotation $V_r$ and from the diameter of the rotor d according to the equation: $V_p = V_r \pi d_r$ (expressed in m·s$^{-1}$), where $V_r$ is the speed of rotation expressed in rev·s$^{-1}$, $d_r$ is the diameter of the rotor (expressed in m) and $\gamma$ is equal to $V_p/e$, where e represents the distance of the gap between the rotor and the stator (expressed in m).

The shear rate generally applied is between 10 000 s$^{-1}$ and 200 000 s$^{-1}$, preferably between 10 000 s$^{-1}$ and 100 000 s$^{-1}$.

The synthesis gel is introduced into the tubular reactor by any suitable means for transferring a fluid, for example by gravity flow, by siphoning or by pumping. The monitoring of the flow rate of the synthesis gel at the inlet of the reactor and/or of the production of crystals at the outlet of the reactor may be obtained according to any means known to a person skilled in the art and preferably by means of pumps, optionally combined with flow regulators.

A "tubular reactor" is understood to mean a reactor or system of reactors having length-to-diameter (or equivalent diameter) ratios of greater than 3, preferably of greater than 10 and more preferably greater than 50, and defining a crystallization reaction zone subjected at least in part to stirring means, whether these are stirring spindles, passive systems such as baffles, restrictions, rings or deflectors or an oscillating or pulsating system (enabling a back-and-forth movement of the reaction medium to be generated by means for example of a piston, membrane), etc., and also two or more of these techniques combined. In a preferred embodiment of the invention, the tubular reactor is provided with restrictions and equipped with a system that enables pulses to be imparted to the fluid circulating in the reactor, as for example described in application US 2009/0304890 by NiTech.

The first introduction of one or more seeding agent(s) into the synthesis gel is preferably carried out upstream of the tubular reactor. In this case, the seeding agent(s) is (are) mixed with the synthesis gel prepared in step a) before it is introduced into the tubular reactor. A seeding agent is understood to mean a solution or a suspension, in liquid form or in the form of a gel, a solid or a liquid that promotes the orientation of the synthesis towards the desired zeolite. Such solids and liquids that promote the orientation of the synthesis towards the desired zeolite are well known to a person skilled in the art and are for example chosen from nucleating gels, zeolite crystals, mineral particles of any nature, etc., and also mixtures thereof.

According to a preferred aspect, the seeding agent is a nucleating gel, and, more preferably, said nucleating gel comprises a homogeneous mixture of a source of silica (for example sodium silicate), a source of alumina (for example alumina trihydrate), optionally but advantageously a strong mineral base, for instance sodium hydroxide, potassium hydroxide or calcium hydroxide to mention but the main ones and the ones most commonly used, and water. One or more structure-directing agents, typically organic structure-directing agents, may also optionally be introduced into the nucleating gel.

The seeding agent(s) may be mixed with the synthesis gel according to any technique well known to a person skilled in the art and preferably using a static mixer, which has the advantage of promoting the homogenization of said mixture.

The crystallization reaction is generally carried out at high temperature, that is to say at a temperature between 60° C. and 200° C., preferably between 80° C. and 160° C. The crystallization of the synthesis gel occurs in the tubular reactor and is promoted by the seeding agent(s). The tubular reactor thus comprises a crystallization reaction medium. The crystallization is also promoted by the temperature applied to said reaction medium, but also by any static or dynamic means of agitating said reaction medium within the reactor as explained previously.

The term "promoted" is understood to mean a better initiation of crystallization and/or greater crystallization kinetics.

The crystallization reaction may be carried out under pressure, for example under autogenous pressure, under atmospheric pressure, or more generally under any pressure, typically between atmospheric pressure and 1.5 MPa.

As indicated previously, the process of the present invention is characterized by the fact that, besides a first introduction (or addition) of seeding agent(s), at least one other addition of seeding agent(s) is carried out during the crystallization step in the reaction medium. The seeding agents that are added during the process of the present invention may all be identical or different. Furthermore, this step of adding seeding agent(s) may be repeated, over time and/or at other points of the tubular reactor.

In an embodiment of the process of the invention, the tubular reactor comprises, besides a first system for introducing seeding agent(s) upstream of the inlet of the tubular reactor, at least one other system for introducing seeding agent(s) at at least one point of the tubular reactor, it being understood that the introduction of seeding agent(s) may be carried out once or several times at one or more points of the tubular reactor.

Thus for example, and in a particular embodiment of the present invention, a second introduction of seeding agent(s), after the start of a first crystallization reaction, enables the start of the growth of a second population of crystals, thus leading to the synthesis of zeolite crystals having a bimodal distribution. By again repeating the addition of seeding agent(s), at the same point of introduction after a first introduction of seeding agent(s), or at another point of the tubular reactor, a trimodal distribution of zeolite crystals is obtained.

According to a very preferred aspect of the invention, the process comprises at least two additions of seeding agent(s) in a continuous manner at one or more points of the tubular reactor.

A person skilled in the art easily understands the great flexibility imparted by the process of the invention, enabling populations of zeolite crystals having controlled and modulated particle size distributions to be generated.

It may also be envisaged to operate with seeding agents and/or synthesis gels of different natures for the purpose of obtaining zeolite crystals that are themselves of different structures. The process of the present invention may specifically be implemented in order to synthesize zeolite crystals of different structures. This, however, does not constitute a preferred embodiment of the present invention.

It may also be envisaged to add a supplement of synthesis gel to the reaction medium, at one or more points of the tubular reactor, as nutrient medium, in order to provide the base elements that form the zeolite, in particular silicon and/or aluminium. The supplementary synthesis gel usually has a composition similar or even identical to that of the synthesis gel introduced at the start. The amount of synthesis gel that may be optionally added represents a minor addition relative to the amount introduced initially, i.e. less than 50% by weight, preferably less than 30% by weight.

The process of the invention makes it possible to obtain a multimodal size distribution of crystals that is adjustable and modulated owing to the introduction, in at least two stages, of seeding agents at different locations of the tubular reactor, preferably operating continuously. In a preferred embodiment, the process of the invention is a continuous synthesis process carried out in a tubular reactor introduced into which, at various locations of the tube, are one or more seeding agents and synthesis gel (nutrient solution) in order to obtain the desired multimodal particle size distribution.

The total amount of seeding agent(s) added in the process of the present invention represents between 0.005% and 10% by weight relative to the synthesis gel, preferably between 0.01% and 5% and more preferably between 0.01% and 3% by weight relative to the synthesis gel introduced at the start into the tubular reactor.

The seeding agent(s) introduced as close as possible to the inlet of the tubular reactor, that is to say before or just after the inlet of the reactor, will generate the largest crystals since the growth thereof will have time to take place whereas the seeding agent(s) introduced subsequently and at one or more other points of the reactor, will give smaller crystals.

At the end of the crystallization reaction, the reaction medium is filtered (step f)) in order to separate the crystals produced on the one hand and the mother liquors on the other hand. This filtration may be carried out according to any method well known to a person skilled in the art, and for example one or more methods chosen from centrifugation, filter press filtration, belt filter filtration, rotary filter filtration, etc.

The crystals obtained at the end of step f) may optionally be subjected to one or more conventional treatments well known to a person skilled in the art, such as washing, cation exchange, drying, impregnation, activation, etc., it being possible for this or these treatment(s) to be carried out in batch mode or continuously, advantageously continuously. For example, the crystals obtained may be subjected to one or more washings with water, so as to eliminate the residual mother liquors that might still be present.

The crystals obtained may also be dried, according to the conventional techniques for drying zeolite crystals, for example at temperatures between 40° C. and 150° C., for a duration that may vary between several minutes and several hours, typically between several minutes and 10 hours. The drying operation at a temperature below 40° C. could prove to be much longer and thus economically unprofitable, whereas a drying temperature above 150° C. could result in a greater or lesser deterioration of the still wet zeolite crystals.

After drying, the zeolite crystals may be used as is, but they are advantageously activated, here too according to conventional activation techniques well known to a person skilled in the art, for example at temperatures between 150° C. and 800° C., for a duration that varies from several minutes to several hours, and typically from several minutes to 10 hours.

The mother liquors resulting from the filtration step f) may advantageously be recycled. One of the advantages of this recycling is to thus enable the reduction in the consumption of sodium hydroxide by introducing the mother liquors directly into the reaction medium or into the silicate solution or else into the aluminate solution (typically that are respectively the sources of silica and of alumina in step a) of the process), or else into the synthesis gel, but may also enable a substantial reduction in energy consumption. Before being recycled, the mother liquors may optionally have undergone one or more treatments chosen from ultrafiltration, reconcentration, distillation, etc.

The process of the present invention is very advantageously carried out continuously, although synthesizing zeolite crystals having a multimodal distribution in batch mode is also possible.

Thus, the process of the present invention enables the continuous synthesis, with several introductions of seeding solution(s) at various levels, of zeolite crystals having a multimodal particle size distribution, this being in a manner that is homogeneous and reproducible and stable over time.

The determination of the particle size distribution corresponds here to the particle number-size distribution of the diameter of the zeolite crystals. This determination is carried out from images obtained by observation under a scanning electron microscope (SEM). For this, a set of images is taken at a magnification of at least 3000. All of the crystals present on the images are measured using dedicated software, for example the Smile View software published by LoGraMi, so as to measure at least 300 crystals, then the distribution by number is plotted in the form of a histogram with categories adapted to the particle size of the crystals, for example categories every 0.2 µm for counting micrometric crystals or for example categories every 0.02 µm for counting crystals of several tens of nanometres.

A "multimodal particle size distribution" is understood to mean a distribution of multimodal size, that is to say having at least two "separate" peaks, in other words at least two "resolved" peaks. The value of the diameter at the top of the peak is referred to as "mode" or else "dominant value", and represents the most common value of the peak. When a distribution has two separate (or resolved) peaks, the distribution is said to be bimodal.

The concept of multimodality is defined using a "criterion" R, known as the "resolution factor" which characterizes the separation or non-superimposition of the peaks.

The various peaks are compared to a Gaussian, characterized by its mode d and its full width at half maximum δ, from which it is possible to deduce the width of the base of the peak ω=1.7 δ.

The resolution factor R of 2 adjacent peaks A and B is conventionally defined (see for example: "Notions fondamentales de chromatographie" [Fundamental chromatography concepts] by Marie-Paule Bassez: http://chemphys.u-strasbg.fr/mpb/teach/chromato1/img0.html) using the following equation:

$$R=2(dB-dA)/(\omega B+\omega A),$$

where dA and dB are respectively the modes of the peaks A and B (in µm), and ωA and ωB are respectively the widths of the base of the peaks A and B (in µm).

As a general rule, two peaks are considered to be resolved, or else completely separate, when the value of R is greater than 1.5. In the context of the present invention, a particle size distribution has a difference in modality when the resolution factor R is greater than 0.5. In the present description, the particle size distribution is considered to be multimodal since at least two peaks are resolved. When the particle size distribution comprises only two resolved peaks, reference is then made to a bimodal particle size distribution.

The process according to the present invention thus enables the production of zeolites, the crystals of which have a controlled or even modulated, bimodal or even multimodal, particle size distribution, it being possible for this production to be carried out industrially very easily, thus enabling a production of large amounts of such zeolites of controlled or even modulated particle size, with production costs much lower than those observed, for example, with productions according to the conventional processes known today.

The zeolites that can be prepared according to the process of the present invention may be of any type and, for example and non-limitingly, any zeolite of MFI type, and in particular silicalite, any zeolite of MOR type, of OFF type, of MAZ type, of CHA type and of HEU type, any zeolite of FAU type, and in particular zeolite Y, zeolite X, zeolite MSX, zeolite LSX, any zeolite of EMT type or else any zeolite of LTA type, i.e. zeolite A, and also the other zeotypes, such as for example titanosilicalites.

The term "zeolite MSX" (medium silica X) means a zeolite of FAU type with an Si/Al atomic ratio of between about 1.05 and about 1.15, limits included. The term "zeolite LSX" (low silica X) means a zeolite of FAU type with an Si/Al atomic ratio equal to about 1.

The process according to the invention is particularly suitable for the preparation of zeolites chosen from zeolites of MFI type, and in particular silicalite, of FAU type, and in particular zeolite Y, zeolite X, zeolite MSX, zeolite LSX, and of LTA type, i.e. zeolite A, and also the zeolites of CHA type and the zeolites of HEU type.

The process according to the invention is moreover very particularly suitable for the preparation of any zeolite of FAU type, and in particular zeolite X, zeolite MSX, zeolite LSX. The zeolites of MFI type, and in particular silicalite, may also be very advantageously prepared according to the process of the invention.

Moreover, the continuous preparation process of the present invention is not limited to the preparation of the zeolites described above, but also includes the corresponding zeolites with hierarchical porosity. The zeolites with hierarchical porosity are solids comprising a microporous network linked to a network of mesopores, and thus make it possible to reconcile the properties of accessibility to the active sites of the mesoporous zeolites known from the prior art and those of maximum crystallinity and maximum microporosity of "conventional" zeolites (without mesoporosity). In this case, specific structure-directing agents are introduced into the reaction medium of step a), for example structure-directing agents of organosilane type as described in document FR 1 357 762.

The synthesis process of the present invention consequently enables an easy and economical industrial synthesis of zeolite crystals, the at least bimodal particle size distribution of which is homogeneous, controlled, or even modulated. Moreover, it has been observed that the process according to the invention is very stable over time when it is carried out in continuous mode. These zeolite crystals find very interesting uses in many fields of application.

Specifically, owing to the process of the invention, it is now possible to more easily obtain zeolite crystals of multimodal distribution in a modulated and homogeneous manner, unlike what would be obtained with mixtures of crystals of various particle sizes.

The multimodal particle size distribution of the zeolite crystals obtained by means of the process of the invention makes it possible to obtain crystals having especially a bulk density that is high, and in particular higher compared to crystals of monomodal particle size distribution. Specifically, the small crystals can be considered to occupy the spaces between the large crystals.

This high bulk density of the zeolite crystals obtained with the process of the invention makes it possible to obtain a very distinctive adsorption performance, especially in terms of adsorption volume capacity.

The zeolite crystals obtained with the process of the invention thus find very interesting applications in the field of adsorption, separation and purification of gases and liquids. As nonlimiting examples, the zeolite crystals obtained according to the process of the present invention may advantageously be used as adsorbent fillers in polymer-based composites, as a constituent of agglomerated zeolite adsorbents used in adsorption separation or purification processes such as pressure swing and/or temperature swing processes, or else in chromatographic type separation processes (fixed beds, moving beds, simulated moving beds), in applications as varied as the purification of industrial gases, the separation of nitrogen and oxygen, the purification of natural gas or of synthesis gas, or else the purification of various petrochemical fractions, the separation of isomers in refining, etc.

The invention claimed is:

1. Process for preparing zeolite crystals having a multimodal particle size distribution, and the sizes of which are between 0.02 µm and 20 µm, said process comprising at least the following steps:
    a) preparing a synthesis gel by mixing at least one source of silica, at least one source of alumina and optionally, at least one aqueous alkali or alkaline-earth metal hydroxide solution,
    b) feeding a tubular reactor with said synthesis gel,
    c) first introduction of one or more seeding agents into the tubular reactor or upstream of the tubular reactor,
    d) second introduction of one or more, identical or different, seeding agents into the tubular reactor,
    e) carrying out the crystallization reaction, in the tubular reactor, of the synthesis gel in the presence of the seeding agent(s), forming the reaction medium,
    f) filtering the reaction medium in order to recover crystals produced.

2. Process according to claim 1, wherein step d) is repeated one, two, three or more times.

3. Process according to claim 1, wherein the first introduction of seeding agent(s) is carried out upstream of the reactor.

4. Process according to claim 1, wherein the seeding agent is chosen from nucleating gels, zeolite crystals, mineral particles, and mixtures thereof.

5. Process according to claim 1, wherein the crystallization reaction is carried out at a temperature of between 60° C. and 200° C.

6. Process according to claim 1, wherein the crystallization reaction is carried out at a pressure between atmospheric pressure and 1.5 MPa.

7. Process according to claim 1, wherein a supplement of synthesis gel is added to the reaction medium, at one or more points of the tubular reactor.

8. Process according to claim 1, wherein the total amount of seeding agent(s) added represents between 0.005% and 10% by weight relative to the synthesis gel introduced at the start into the tubular reactor.

9. Process according to claim 1, wherein the mother liquors from the filtration step f) are recycled.

10. Process according to claim 1, wherein the zeolite crystals are crystals of zeolite chosen from zeolites of MFI type, zeolites of MOR type, zeolites of OFF type, zeolites of MAZ type, zeolites of CHA type, zeolites of HEU type, zeolites of FAU type, zeolites of EMT type, and zeolites of the LTA type.

* * * * *